March 5, 1940.     J. J. IMHOFF     2,192,678
BRAKE
Original Filed Sept. 9, 1936     3 Sheets-Sheet 1
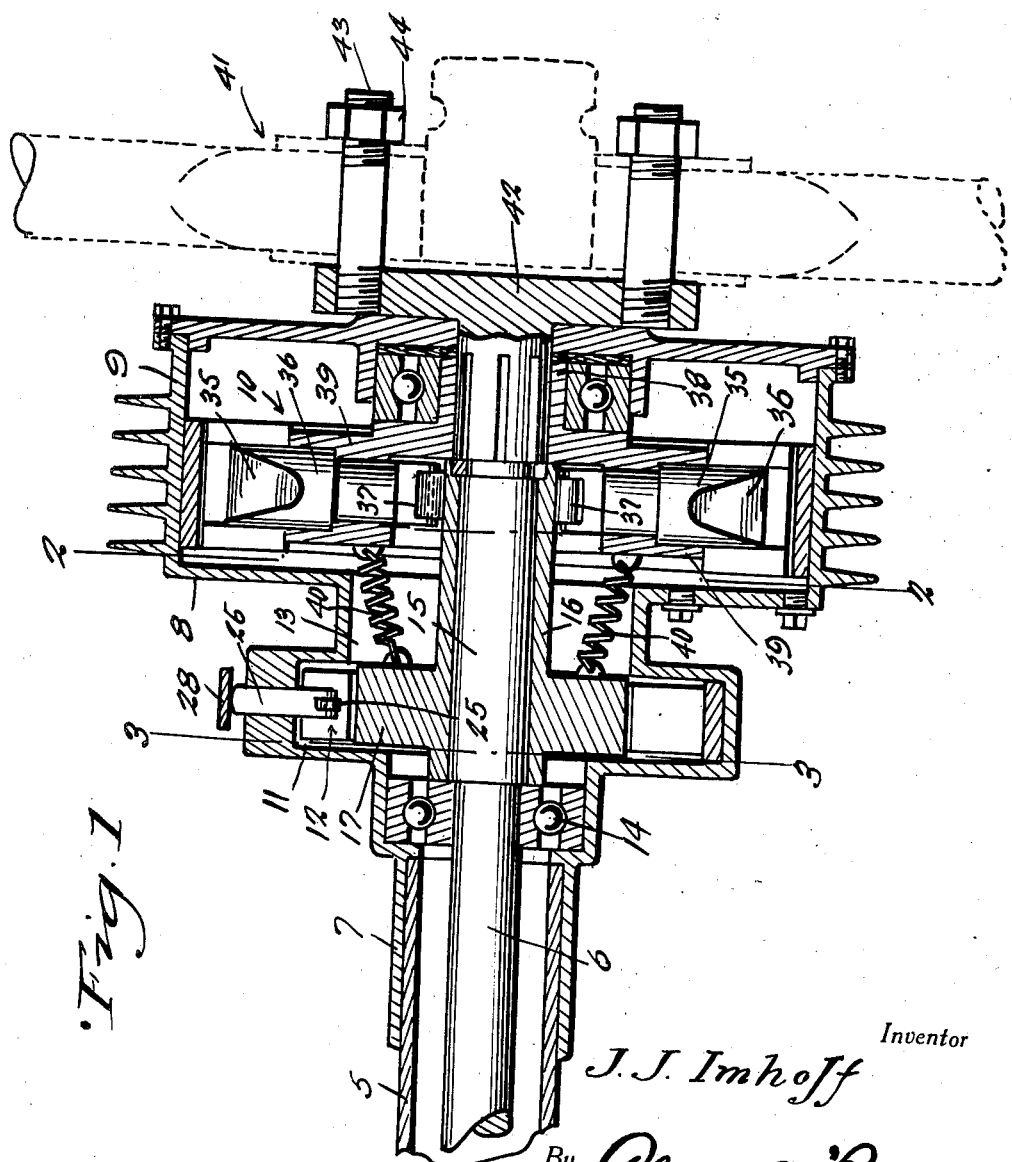
Inventor
J. J. Imhoff
By Clarence A. O'Brien
Hyman Berman
Attorneys March 5, 1940.  J. J. IMHOFF  2,192,678
BRAKE
Original Filed Sept. 9, 1936   3 Sheets-Sheet 2
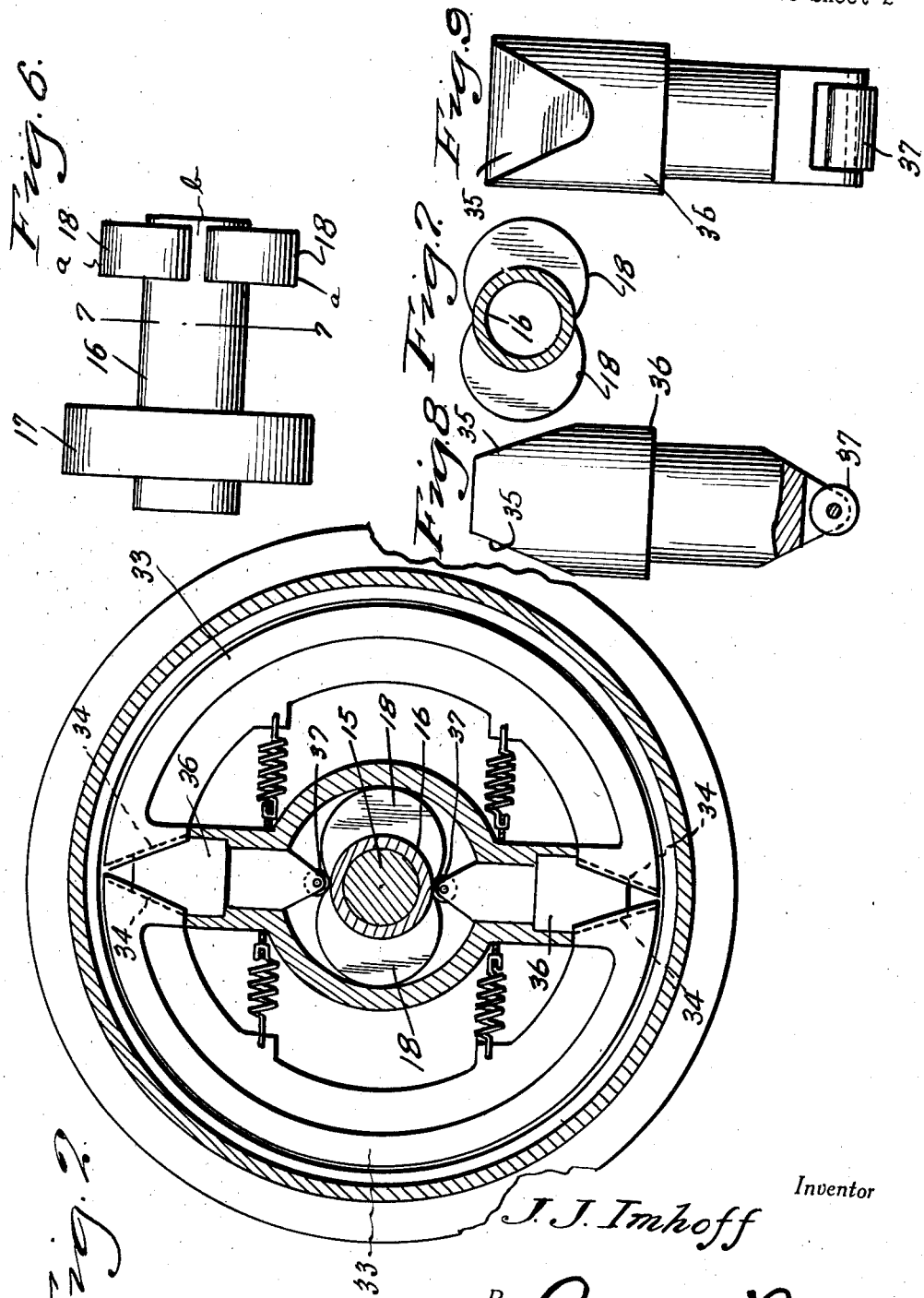
Inventor
J. J. Imhoff
By Clarence A. O'Brien
Hyman Berman
Attorneys March 5, 1940.     J. J. IMHOFF     2,192,678
BRAKE
Original Filed Sept. 9, 1936     3 Sheets-Sheet 3
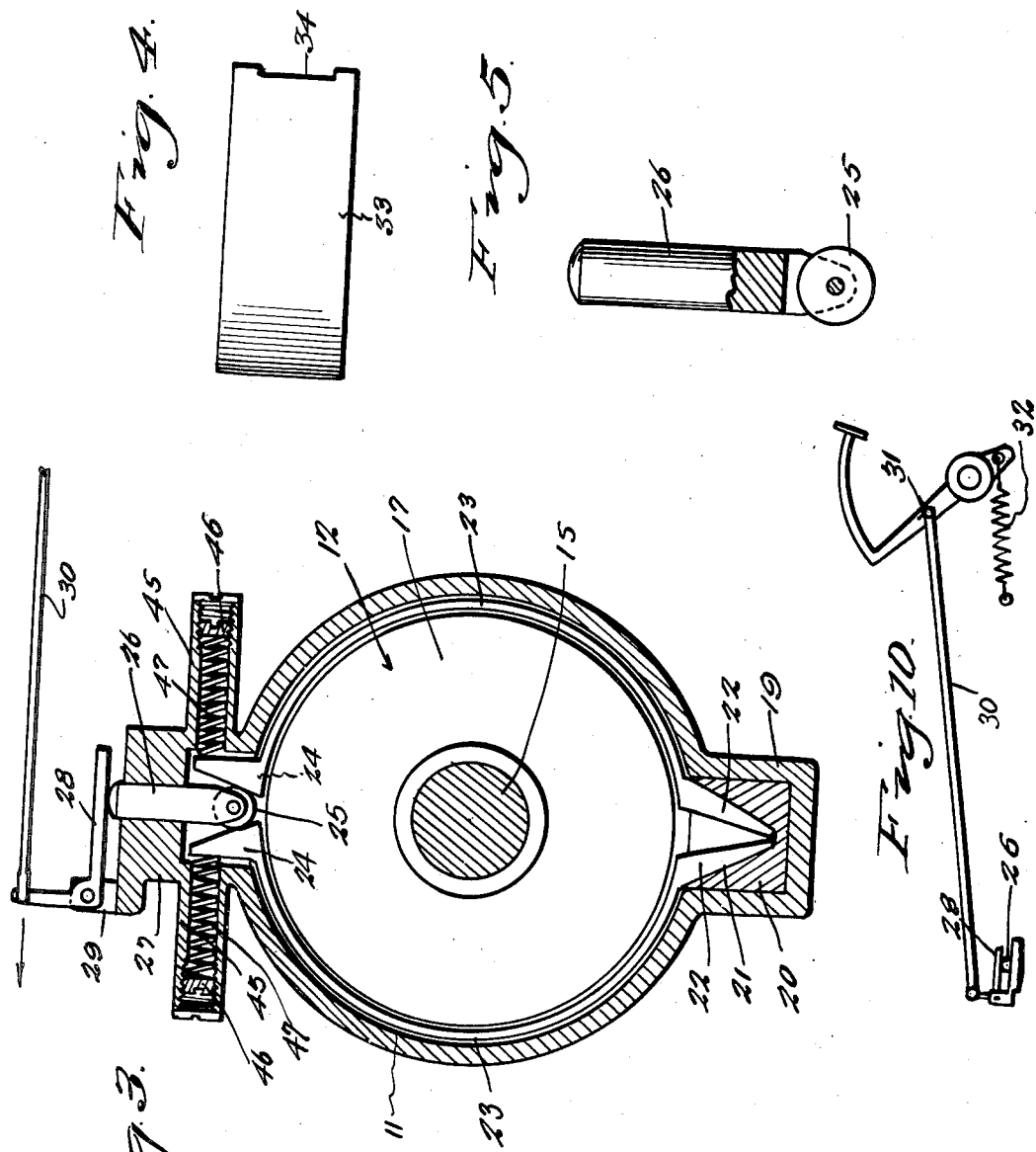
Inventor
J. J. Imhoff
By Clarence A. O'Brien
Hyman Berman
Attorneys Patented Mar. 5, 1940

2,192,678

UNITED STATES PATENT OFFICE 2,192,678

BRAKE

John Joseph Imhoff, Calgary, Alberta, Canada

Application September 9, 1936, Serial No. 100,016
Renewed July 22, 1939

4 Claims. (Cl. 188—140)

This invention relates to new and useful improvements in mechanical brakes for vehicles, the principal object of the invention being to provide a brake to retard or stop the motion of a vehicle upon which it is installed by means of the power supplied by the momentum of the vehicle.

Another important object of the invention is to provide a brake which is automatic in operation and not susceptible to the development of ready defects.

Still another important object of the invention is to provide a brake which will automatically set the brake in the event the brake rod becomes broken.

Furthermore, it is to be understood that the present case is a continuation in part of my co-pending application Serial No. 66,168, filed February 28, 1936.

In the drawings:

Figure 1 represents a fragmentary vertical longitudinal sectional view through the improved brake.

Fig. 2 is a cross section on line 2—2 of Fig. 1.

Fig. 3 is a cross section on line 3—3 of Fig. 1.

Fig. 4 is a top plan view of one section of the clutch band.

Fig. 5 is a side elevational view partly in section, showing the clutch band actuator.

Fig. 6 is a side elevational view of the clutch rotor and brake cam assembly.

Fig. 7 is a cross section on line 7—7 of Fig. 6.

Fig. 8 is a side elevational view partly in section of one of the cam operated wedges.

Fig. 9 is a front elevational view of one of the wedges.

Fig. 10 represents a diagrammatic view of the brake pedalled rod control for the brake.

Referring to the drawings wherein like numerals designate like parts, it can be seen that numeral 5 represents the housing for the axle 6 which engages into and is suitably welded to the sleeve 7 which projects from the housing 8 of the brake. This housing of the brake consists of the drum 9 of the brake mechanism generally referred to by numeral 10 and the circular chamber 11 for the clutch mechanism generally referred to by numeral 12. The housing is provided with a reduced portion defining a small passageway 13 between the interior of the drum 9 and the clutch 12. A ball bearing assembly 14 is provided between the housing and the axle 6 at the inboard side of the clutch 12.

On the enlarged portion 15 of the axle 6 is the unit shown in Fig. 6 which consists of the sleeve 16 having the rotor 17 fixed to one end portion thereof and a pair of oppositely disposed and radially extending cams 18—18 on the opposite end thereof defining high points A and low points B, the low points being against the sleeve 16.

Below the rotor 17, the housing 8 is provided with a well 19 having a block 20 therein provided with a V-shaped opening 21 for receiving the tapered leg portions 22—22 of the clutch band sections 23—23 which encompass the rotor 17 of the clutch mechanism 12. The upper ends of the sections 23—23 are provided with upstanding heads 24—24 provided with downwardly converging beveled opposed faces against which the roller 25 in the lower bifurcated end of the plunger 26 operates. This plunger extends through the formation 27 at the top of the housing 8 above the clutch and has one leg of the bell crank 28 bearing against the same. This bell crank is rockable on the ears 29 on the formation 27 and the brake rods 30 extend from the upstanding leg of this bell crank to the upper end of the usual foot brake pedal 31. This rod 30 is normally held under tension by a spring 32 so that the plunger 26 is maintained in the downward position shown in Fig. 3, to hold the clutch band sections 23—23 spaced from the rotor 17.

Referring to the brake mechanism 10 it can be seen that the numerals 33—33 represent brake bands, the opposed ends of which are cut off on outwardly converging bevels and grooved as at 34 to receive the tapered end portions 35 of the wedge members 36, each of which is bifurcated at its inner end to support a roller 37 which can ride against the cam 18 on the sleeve 16.

A collar 38 is splined to the axle 6 and has the radially disposed barrels 39 thereon for slidably receiving the wedge members 36, the barrels 39 being connected to the rotor 17 by coiled extensible springs 40.

Numeral 41 represents the usual wheel construction which is secured to the wheel plate 42 by bolts 43 and nuts 44.

Now referring to Fig. 3, it can be seen that tubes 45—45 extend in opposite directions from the formation 27 and each is internally threaded for receiving the threaded plug 46. Interposed between each of these plugs 46 and the corresponding band section heads 24 is a coiled compressible spring 47.

In the operation of the brake, it can now be seen, that when the brake rod is operated by the brake pedal 31, the lower leg of the bell crank 28 will rise from the top of the plunger 26, permitting the spring 47 to urge the clutch band heads 24—24 together, so that these band sections are clamped against the rotor 17. Thus, the rotor 17 is held against rotation and as the collar 38 is keyed on the axle 6 and carries with it the brake shoes 33—33, the brake assembly 10 will have a tendency to rotate on the sleeve 16 instead of with the sleeve, which will result in the riding of the rollers 37 off of the low point B and onto the cams 18, causing projection of the wedges 36 into the spaces between the ends of the shoes 33 so that the shoes are expanded to braking position against the drum 9. The brake as illustrated in the drawings is employed for rear wheel use.

It is to be understood that this brake can be adapted to front steerable wheels without in any way modifying the brake proper.

While the foregoing specification sets forth the invention in specific terms, it is to be understood that numerous changes in the shape, size and materials may be resorted to without departing from the spirit and scope of the invention as hereinafter claimed.

Having thus described the invention, what is claimed as new is:

1. In a brake mechanism, a rotary axle, a stationary brake drum surrounding said axle, brake shoes in said drum mounted on said axle for rotation therewith and expansion against said drum, shoe expanding means in said drum rotatable with said shoes, and means to operate said shoe expanding means comprising a sleeve on said axle normally rotating therewith and adapted to be held stationary for rotation of said expanding means relative thereto, cams on said sleeve for operating said expanding means under such relative rotation of the latter, and means to hold said sleeve stationary including a rotor on said sleeve, a split brake band surrounding said rotor and adapted for contraction and expansion to engage and disengage the same, respectively, means tending to contract said band, and manually operative means for controlling contraction of the band at will.

2. In a brake mechanism, a rotary axle, a stationary brake drum surrounding said axle, brake shoes in said drum mounted on said axle for rotation therewith and expansion against said drum, shoe expanding means in said drum rotatable with said shoes, means to operate said shoe expanding means comprising a sleeve on said axle normally rotating therewith and adapted to be held stationary for rotation of said expanding means relative thereto, cams on said sleeve for operating said expanding means under such relative rotation of the latter, and means to hold said sleeve stationary including a rotor on said sleeve, a split brake band surrounding said rotor and adapted for contraction and expansion to engage and disengage the same, respectively, means tending to contract said band, and manually operative means for controlling contraction of the band at will, said shoes having opposed beveled ends, and said expanding means comprising wedge members adapted for driving by said cams between said ends of the shoes.

3. In a brake mechanism, a rotary axle, a stationary and totally enclosed brake drum surrounding said axle, brake shoes in said drum mounted on said axle for rotation therewith and expansion against said drum, spring means tensioning said shoes against expansion, shoe expanding means in said drum rotatable with said shoes, and means to operate said shoe expanding means comprising a sleeve on said axle normally rotating therewith and adapted to be held stationary for rotation of said expanding means relative thereto, cams on said sleeve for operating said expanding means under such relative rotation of the latter, and means to hold said sleeve stationary including a rotor on said sleeve, a split brake band surrounding said rotor and adapted for contraction and expansion to engage and disengage the same, respectively, means tending to contract the band, and manually operative means for controlling contraction of the band at will.

4. In a brake mechanism, a rotary axle, a stationary brake drum surrounding said axle, a brake shoe mounting fast on said axle for rotation therewith and extending into said drum, brake shoes on said mounting rotating therewith and adapted for expansion against said drum, shoe expanding means on said mounting rotating therewith and with said shoes, and means to operate said shoe expanding means comprising a sleeve on said axle yieldingly connected to said mounting to be normally rotated thereby and adapted to be held stationary for rotation of said expanding means relative thereto, cams on said sleeve for operating said expanding means under such relative rotation of the latter, and means to hold said sleeve stationary including a rotor on said sleeve, a split brake band surrounding said rotor and adapted for contraction and expansion to engage and disengage the same, respectively, means tending to contract the band, and manually operative means for controlling contraction of the band at will.

JOHN JOSEPH IMHOFF.